United States Patent
Berneck et al.

(10) Patent No.: US 11,852,731 B2
(45) Date of Patent: Dec. 26, 2023

(54) TEST BENCH FOR TESTING A DISTANCE SENSOR OPERATING WITH ELECTROMAGNETIC WAVES

(71) Applicant: dSPACE GmbH, Paderborn (DE)

(72) Inventors: Dirk Berneck, Paderborn (DE); Albrecht Lohoefener, Paderborn (DE); Vitali Anselm, Geseke (DE); Michael Rozmann, Eichenau (DE)

(*) Notice: Subject to any disclaimer, the term of this patent is extended or adjusted under 35 U.S.C. 154(b) by 248 days.

(21) Appl. No.: 17/416,895

(22) PCT Filed: Dec. 20, 2019

(86) PCT No.: PCT/EP2019/086697
§ 371 (c)(1),
(2) Date: Jun. 21, 2021

(87) PCT Pub. No.: WO2020/127984
PCT Pub. Date: Jun. 25, 2020

(65) Prior Publication Data
US 2022/0082700 A1 Mar. 17, 2022

(30) Foreign Application Priority Data
Dec. 21, 2018 (DE) ............... 10 2018 133 521.0

(51) Int. Cl.
*G01S 17/93* (2020.01)
*G01S 17/931* (2020.01)
(Continued)

(52) U.S. Cl.
CPC ............ *G01S 17/931* (2020.01); *G01S 7/403* (2021.05); *G01S 7/4034* (2021.05);
(Continued)

(58) Field of Classification Search
CPC ...... G01S 17/931; G01S 13/391; G01S 7/403; G01S 7/4972; G01S 7/4086; G01S 7/4034
See application file for complete search history.

(56) References Cited

U.S. PATENT DOCUMENTS

| 7,405,692 B2 | 7/2008 | McMakin et al. |
| 2004/0090359 A1 | 5/2004 | McMakin et al. |

(Continued)

FOREIGN PATENT DOCUMENTS

| CN | 101082667 A | 12/2007 |
| EP | 3115804 A1 | 1/2017 |

(Continued)

OTHER PUBLICATIONS

Rozmann, Michael; "Echte Echos im Labor, Radartestplatz"; dSPACE Magazin, Feb. 2017, publ. im.; Dec. 1, 2017; 4 Pages.
(Continued)

*Primary Examiner* — Curtis B Odom
(74) *Attorney, Agent, or Firm* — Patrick D. Duplessis (57) ABSTRACT

A test bench (1) is described and shown for testing a distance sensor (2) operating with electromagnetic waves, wherein the distance sensor (2) to be tested comprises at least one sensor radiating element (3a) for radiating a transmission signal (4) and a sensor receiving element (3b) for receiving a reflection signal, with a receptacle (5) for holding the distance sensor (2) to be tested, with an at least partially movable connecting member (6, 6m, 6s) in the radiation area of a distance sensor (2) held in the receptacle (5), with at least one test bench receiving element (7) held in the connecting member (6, 6m, 6s) for receiving a transmission signal (4) radiated by the sensor radiating element (3a), and with at least one test bench radiating element (8) held in the connecting member (6) for radiating a test bench transmitting signal (9) as a simulated reflection signal.

(Continued)

A reliable environment simulation, in particular for the testing of multiple input-multiple output distance sensors (2) is achieved in that at least one test bench receiving element (7, 7a, 7b) and one test bench radiating element (8, 8a, 8b) are arranged together in a movable part (6m) of the connecting member (6).

12 Claims, 5 Drawing Sheets

(51) Int. Cl.
*G01S 7/40* (2006.01)
*G01S 7/497* (2006.01)
*G01S 13/931* (2020.01)

(52) U.S. Cl.
CPC .......... *G01S 7/4086* (2021.05); *G01S 7/4972* (2013.01); *G01S 13/931* (2013.01); *G01S 7/4095* (2021.05); *G01S 2013/9323* (2020.01)

(56) References Cited

U.S. PATENT DOCUMENTS

| | | |
|---|---|---|
| 2013/0002474 A1 | 1/2013 | Shipley |
| 2017/0010346 A1 | 1/2017 | Rolfsmeier et al. |
| 2018/0100783 A1 | 4/2018 | Stieff et al. |

FOREIGN PATENT DOCUMENTS

| | | |
|---|---|---|
| JP | 2005114698 A | 4/2005 |
| JP | 2007517275 A | 6/2007 |
| JP | 2010048673 A | 3/2010 |
| JP | 2017021026 A | 1/2017 |
| WO | 9927383 A1 | 6/1999 |
| WO | 2019229047 A2 | 12/2019 |

OTHER PUBLICATIONS

International Search Report and Written Opinion of the International Searching Authority; Application No. PCT/EP2019/086697; Completed: Mar. 30, 2020; dated Apr. 8, 2020; 16 Pages.

TEST BENCH FOR TESTING A DISTANCE SENSOR OPERATING WITH ELECTROMAGNETIC WAVES

TECHNICAL FIELD

The invention relates to a test bench for testing a distance sensor operating with electromagnetic waves, wherein the distance sensor to be tested comprises at least one sensor radiating element for radiating a transmission signal and a sensor receiving element for receiving a reflection signal, with a receptacle for holding the distance sensor to be tested, with an at least partially movable connecting member in the radiation area of a distance sensor held in the receptacle, with at least one test bench receiving element held in the connecting member for receiving a transmission signal radiated by the sensor radiating element, and with at least one test bench radiating element held in the connecting member for radiating a test bench transmitting signal as a simulated reflection signal.

BACKGROUND

The aforementioned test benches have been known for a short time from the field of ECU (electronic control unit) development and ECU testing—for example in the automotive field. A common test scenario here is to test the functionality of a production ECU using a simulated environment. For this purpose, the environment of the ECU is calculated in real time in parts or even completely by means of a powerful simulation environment, wherein the simulation environment generates physical signals that are the input signals of the ECU, and wherein the simulation environment receives the output signals generated by the ECU and incorporates them into the real-time simulation. ECUs can thus be tested safely in a simulated environment under practically "real" conditions. How realistic the test is depends on the quality of the simulation environment and the simulation calculated on it. ECUs can thus be tested in a closed control loop, which is why such test scenarios are also referred to as hardware-in-the-loop tests.

In this case, the test involves distance sensors that work with electromagnetic waves. In the automotive sector, radar sensors are predominantly used. In principle, however, it is also possible to test distance sensors that operate in a different frequency range of electromagnetic waves, for example in the range of visible light, or that operate with electromagnetic radiation sources that emit electromagnetic waves with a long coherence length, such as in laser applications (for example lidar).

Distance sensors are increasingly used in modern vehicles to provide the vehicle and its assistance systems with environmental information. For example, the position, speed and/or acceleration of objects in the vehicle environment are determined—i.e., location and movement data—but some distance sensors can also be used to capture the return radiation intensity and the radiation pattern of an ambient object, for example taking into account the intensity of the reflected radiation. Assistance systems that use such ambient information include, for example, adaptive cruise control (ACC) and autonomous emergency breaking (AEB). It is understandable that the testing of such safety-relevant assistance systems must be carried out with a high degree of care, wherein the propagation behavior of the electromagnetic waves must also be taken into account as realistically as possible. In the past, this was mainly done using very costly and time-consuming real driving tests. These driving tests are increasingly being replaced by the test benches described above for testing a distance sensor, in which free-space waves are also used. Such test benches are also called OTA test benches (over the air), in which the distance sensor to be tested actually emits electromagnetic waves into the free space, i.e., unguided, and also receives electromagnetic waves from the free space as a simulated reflection signal. The advantage of such OTA test benches is the farreaching verification of the entire chain of effect in connection with the distance sensor under test, including the radiation and reception behavior involving the sensor radiating element and the sensor receiving element. Furthermore, the influence of the installation situation of the distance sensor under test can be checked, e.g., how does the bumper influence the electromagnetic waves.

It follows from the above that the term "distance sensor" is not to be understood here in such a restrictive way that it must be suitable exclusively for determining distance; on the contrary, it can also be used to determine location and movement parameters and return radiation properties of surrounding objects. Regardless of the type of electromagnetic wave used by the distance sensor to be tested, extremely high demands are placed on the overall electronic signal processing required when testing distance sensors, even though signal processing is not the primary concern of the present patent application. Distances of an object in the environment are usually directly determined by the signal propagation time, which requires the radiated electromagnetic waves to the object and reflected from the object back to the distance sensor. Velocities of objects in the environment are detected by frequency shifts between the radiated electromagnetic wave and the reflected electromagnetic wave (Doppler shift). Due to the electromagnetic waves propagating essentially at the speed of light, very small signal travel times must be resolved here. For example, in order to capture a minimum distance of one meter, signal propagation times in the nanosecond range must be resolved. If larger distances, i.e., independent of the question of the minimum distance, are to be captured in the range of centimeters, it must also be possible to resolve propagation time differences in the sub-nanosecond range.

In the test bench, the electromagnetic waves emitted by the distance sensor under test should not actually be reflected; rather, the emitted electromagnetic waves are received by a test bench receiving element and processed in fast signal processing electronics downstream, a reflection simulator, namely propagation time delayed and, if necessary, frequency shifted. Depending on the distance to be simulated to a simulated surrounding object or depending on the relative speed of the surrounding object to the distance sensor to be tested, correspondingly time-delayed and/or frequency-shifted signals are generated in the reflection simulator and emitted again as a simulated—i.e., not actual—reflection signal via the sensor radiating element in the direction of the distance sensor to be tested. Depending on the equipment of the reflection simulator, it can also influence the amplitude of the reflection signal, so that the size of an ambient object can also be simulated. This gives the distance sensor the impression of a real environment with, if necessary, several objects at different distances and with different movements in the simulated environment.

Test benches known from the prior art ("Echte Echos im Labor" (Real Echoes in the Lab): dSPACE Magazine 2/2017 from December 2017) are characterized in that the entire connecting member, especially in a stationary part of the connecting member, has a single test bench receiving element arranged to receive a transmission signal emitted by the sensor emitting element, i.e., also independent of how many objects are to be simulated in an object environment. However, a plurality of test bench radiating elements are then arranged in various movable parts of the connecting member, each test bench radiating element being used for one object to be simulated in the object environment.

The test bench radiating elements known from the prior art can be separately azimuthally deflected, so that object positions "to the left" and "to the right" of the radiation direction of the distance sensor under test can be simulated. A downstream reflection simulator has information about the distance and movement of the objects to be simulated in the object space, for example, in order to react with adapted signal intensities of the simulated reflection signals radiated by the test bench radiating elements in each case, and to adjust corresponding time delays and frequency shifts.

According to the invention, it has been recognized that difficulties arise in particular when distance sensors to be tested operate according to the MIMO (multiple input-multiple output) principle. These novel distance sensors have multiple sensor radiating elements and multiple sensor receiving elements, which are interconnected to form an array and can be evaluated in their entirety or work together in varying combinations. Thus, such distance sensors are able to perform a direction estimation by evaluating the echo signal. With the test bench known from the prior art, a reliable environment simulation for such a distance sensor is only possible with limitations, and the distance sensor to be tested can possibly end up in error situations.

SUMMARY

It is thus the object of the invention to provide a test bench with which a higher reliability is also achieved when testing distance sensors operating using the MIMO principle.

The above derived object is achieved in the test bench described at the beginning for testing a distance sensor operating with electromagnetic waves in that at least one test bench receiving element and one test bench radiating element are arranged together in a movable part of the connecting member. This ensures that the test bench receiving and radiating elements arranged in one and the same moving part of the connecting member are deflected together and thus assume a comparable position relative to the distance sensor under test. As a result, distance sensors operating according to the MI MO principle can also be tested with good accuracy and with increased safety, especially compared to such test benches with only a single stationary test bench receiving element.

According to the invention, it has in fact been recognized that the difficulties in testing MIMO distance sensors in particular are due to the fact that the wave characteristic in a stationary reception of the electromagnetic waves radiated by the distance sensor to be tested can deviate so significantly from a wave characteristic occurring in a position deviating from the stationary position that such simulated reflection signals are generated and radiated by the respective test bench radiating element which no longer do justice to the actual physical situation. In principle, this problem can be eliminated with the test bench design according to the invention. The problem described could be mitigated in a test bench known from the prior art by providing a downstream reflection simulator with information about the operation of the distance sensor to be tested. However, this is costly and error-prone and contradicts the purpose of a test bench, which is to simulate the environment to be simulated as objectively as possible without having detailed information about the operation of the ECU under test and incorporating this into a simulation. With the test bench according to the invention, this is not necessary.

In a further development of the test bench according to the invention, it is provided that at least one test bench receiving member and at least one test bench radiating member are arranged together in each of several different movable members of the connecting member. This makes it possible to use each different moving member of the connecting member to simulate a respective object in the virtual object space for the distance sensor to be tested.

According to one design of the test bench according to the invention, it is further provided that the test bench receiving member and the test bench radiating member arranged together in a movable part of the connection member are formed as an identical test bench receiving and radiating element. This means that this identical test bench receiving and radiating element is used both for receiving the transmitted signal emitted by the distance sensor and for radiating the simulated reflection signal. Specifically, the identical test bench receiving/radiating element may be designed as a common antenna for radar waves, as a common optical element for electromagnetic waves in the visible spectrum, or specifically as a common laser receiving/radiating element. In this arrangement, it may be useful or even necessary for a downstream reflection simulator to have a signal switch that either feeds the received signal to receiving electronics or feeds a simulated reflection signal generated by the reflection simulator to the test bench receiving/radiating element.

In a further embodiment, the test bench receiving element and the test bench radiating element arranged together in a movable part of the connecting member are arranged adjacent to each other as a separate test bench receiving element and a separate test bench radiating element. As in the previously mentioned variation, these can be separate antennas for radar waves, separate optical elements for electromagnetic waves in visible light, or separate laser receiving elements and laser radiating elements. In this embodiment, the downstream electronics of a distance simulator do not necessarily require a signal switch, since the received signal and the simulated reflection signal to be emitted can be processed via different channels. Both described variations—integrated and separate design—can also be implemented together in a test bench, namely with different functional pairs of test bench receiving element and test bench radiating element.

A preferred design of the invention is characterized in that the connecting member and/or the movable part of the connecting member is configured as an arc-shaped element, wherein the element opens concavely towards the holder of the distance sensor under test. In particular, the connecting member and/or the movable part of the connecting member can have a circular ring or circular ring segment shape. As a result, the connecting member and/or the movable part of the connecting member surrounds the distance sensor under test, which is located in a practically central position relative to the connecting member and/or the movable part of the connecting member. However, the distance sensor to be tested can also be located off-center in the circular ring-shaped or circular ring segment-shaped part of the connecting member; it must be located within the effective range of the test bench elements. Consequently, the arc-shaped element opens concavely towards the holder of the distance sensor to be tested. Specifically, it is provided that the movable part of the connecting member is mounted so as to be movable horizontally (azimuthally) along its arc shape. If the element is circular ring-shaped or circular ring segment-shaped, it preferably moves along its circular ring shape or its circular ring segment shape. A particular advantage of this arrangement is that the test bench receiving element and the test bench radiating element, which according to the invention are always arranged as functional pairs in the moving parts of the connecting member, are always aligned approximately in the direction of the distance sensor to be tested, without having to be specially tracked and aligned in the azimuthal direction.

In a further development of the aforementioned design, it is provided that the connecting member has a plurality of movable parts which are configured as arc-shaped elements mounted one above the other and movable relative to one another, in particular wherein the plurality of movable parts of the connecting member have a common axis of rotation. The axis of rotation does not have to be a physical axis, but can also be a non-tangible axis of rotation. In particular, it is provided that the movable arc-shaped elements are circular ring-shaped or circular ring segment-shaped.

When the movable parts of the connecting member are designed as arc-shaped elements, it is especially possible to drive and deflect the elements formed in this way by means of a belt drive. The belt drive can, for example, comprise a toothed belt which is guided and tensioned around the circumference of the respective arc-shaped element, with an electromotive drive forming another tensioning point of the belt drive. This electromotive drive can be arranged, in particular, in the rear region of the distance sensor, so that the intermediate space between the distance sensor to be tested and the connecting member is kept completely free of drive elements.

In a preferred design of the test bench, the connecting member is covered with an absorber material for the electromagnetic radiation used in the areas in which no test bench receiving element and no test bench radiating element is held, or the connecting member is formed from such a material in these areas. This is used to prevent true reflection signals. Only simulated reflection signals radiated by the respective test bench radiating element are to be applied to the distance sensor under test, because only these simulated reflection signals exhibit the desired time delay and frequency shift.

In a further development of the test bench according to the invention, a reflection simulator is also comprised, wherein the reflection simulator is connected in terms of signals to the at least one test bench receiving element and the at least one test bench radiating element—which form a common functional pair and which are arranged together in a movable part of the connecting member. The reflection simulator—as previously described—is then designed to receive the transmission signal radiated by the distance sensor under test via the test bench receiving element and, on the basis of provided location and movement information of a simulated surrounding object, to generate a corresponding simulated test bench transmission signal and to radiate it via the test bench radiating element in the direction of the distance sensor under test.

In a further design of the test bench with a reflection simulator, the test bench receiving element and/or the test bench radiating element is connected to the reflection simulator via a multi-conductor cable. One conductor or one conductor pair of the multi-conductor cable is used to supply power to the test bench receiving element and/or the test bench radiating element. Another conductor of the multi-conductor cable is used to transmit an oscillator signal from the reflection simulator to the test bench receiving element. There, the oscillator signal is used for down-converting the frequency of the received transmission signal from the distance sensor under test. Alternatively, or additionally, the transmitted oscillator signal is used for up-converting of the frequency of a low-frequency reflection signal simulated by the distance simulator. Another conductor of the multi-conductor cable is used for transmitting the transmission signal of the distance sensor under test, which is received and down-converted in the test bench receiving element, to the reflection simulator, or for transmitting the low-frequency reflection signal simulated and generated by the reflection simulator from the reflection simulator to the test bench radiating element. The use of such a multi-conductor cable significantly simplifies the test bench setup and reduces the susceptibility to errors. In another design, the multi-conductor cable is replaced by a coaxial cable with multiple shields and a central conductor, wherein the supply voltage, the oscillator signal, and the transmission and receive signals are guided by the central conductor of the coaxial cable.

In another advantageous design of the test bench, the reflection simulator is connected in terms of signals to an environment simulator so that the reflection simulator receives location and motion information of a simulated environment object from the environment simulator for each functional pair of a test bench receiving element and a test bench radiating element, which are arranged together in a movable part of the connecting member. This allows the reflection simulator to delay and also frequency shift the received transmission signal from the distance sensor according to the distance and motion information, and then re-radiate it; thereby achieving the desired simulation effect. In closed-loop use cases, there is also a signal connection between the environment simulator and the distance sensor under test, wherein the distance sensor can provide feedback to the environment simulator, which may be in the form of a hardware in the loop (HIL) simulator, for example. Also, for the purposes of a residual bus simulation for the distance sensor, a connection is provided between the environment simulator and the distance sensor under test. Typically, the distance sensor detection algorithms require information about the vehicle, such as current vehicle speed, steering angle, etc. These signals are then sent from the environment simulator or HIL simulator to the distance sensor.

In a further embodiment of the test bench, it is further provided that a drive of a functional pair of a test bench receiving element and a test bench radiating element is connected in terms of signals to an environment simulator. The environment simulator calculates location and motion information of the functional pair of test bench receiving element and test bench radiating element from the simulated relative position of the distance sensor under test to a simulated environment object. The environment simulator then controls the drive to actualize the calculated location and motion information accordingly.

BRIEF DESCRIPTION OF THE DRAWINGS

In detail, there are now various possibilities for further developing and designing the test bench. This is illustrated in connection with the following figures.

DETAILED DESCRIPTION

Figure 1:
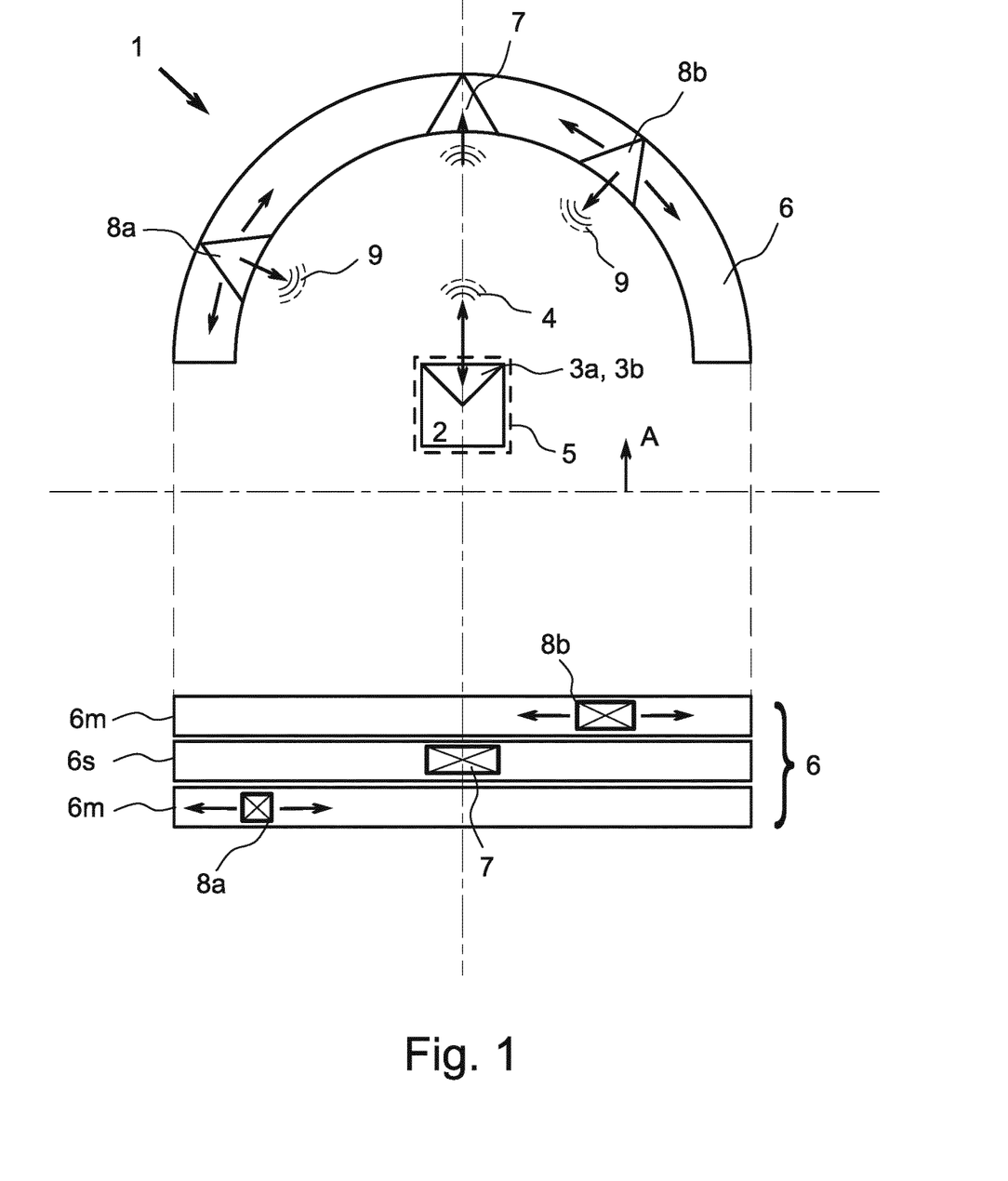
FIG. 1 illustrates a test bench known in principle from the prior art.

FIG. 1 shows a test bench 1 known in principle from the prior art. The test bench 1 is used to test a distance sensor 2 operating with electromagnetic waves. The electromagnetic waves are indicated by curved wave lines in the figures. The distance sensor 2 to be tested has a sensor radiating element 3a for radiating a transmission signal 4 and a sensor receiving element 3b for receiving a reflection signal.

The test bench 1 further has a receptacle 5 for holding the distance sensor 2 to be tested. The receptacle 5 is simply understood to be the location where the distance sensor 2 to be tested is to be positioned to ensure optimal operation of the test bench 1. Thus, the receptacle 5 need not have any special mechanical design.

The distance sensor 2 radiates its transmission signal 4 in the direction of a connecting member 6, which is consequently located in the radiation area of the distance sensor 2. The transmission signal 4 is actually not to be reflected in the test bench 1, a real physical reflection is even to be avoided. Rather, the goal is for the transmission signal 4 to be received by a test bench receiving element 7 held in the connecting member 6. The received transmission signal 4 is then fed to a reflection simulator 14, which is not shown in FIGS. 1 to 4 and is only shown schematically in FIG. 5, where it is delayed and modulated—in particular frequency-shifted—according to certain specifications and radiated as a test bench transmitting signal 9 by means of a test bench radiating element 8, which is also held in the connecting member 6; the test bench transmitting signal 9 is therefore not an actual reflection signal, but a simulated reflection signal.

In the upper part of the schematic diagram in FIG. 1, it initially appears that the test bench receiving element 7 and the test bench radiating elements 8a, 8b are held in a common part of the connecting member 6. This is, in fact, not so, as can be seen from the lower part of FIG. 1 (the same applies, incidentally, to FIGS. 2 to 4). The lower part of FIG. 1 shows a side view of the test bench 1 in direction A, i.e., the direction of view is from the distance sensor 2 in the direction of the connecting member 6. In this view, it can now be seen that the connecting member 6 consists of various segments mounted one above the other. These segments are circular ring segments. The middle element 6s ("s" for "stationary") is not moved. The connecting member 7 of the test bench is held in the non-moving part 6s of the connecting member 6, so that the test bench receiving element 7 is also stationary and is practically always positioned directly opposite the receptacle 5 of the distance sensor 2. The two circular segment rings 6m ("m" for "movable") of the connecting member 6 are mounted for rotational movement, namely in the circumferential direction of the circular segment-shaped connecting member 6. This rotational movement is indicated in the circular segment rings 6m of the connecting member 6 by the arrows to the left and right of the test bench radiating elements 8a and 8b. These test bench radiating elements 8a and 8b can consequently move around the distance sensor 2 under test and thus radiate test bench transmitting signals 9 as simulated reflection signals onto the distance sensor 2 under test from different directions. In this way, different objects in a simulated environment can be simulated with respect to the distance sensor 2 under test.

It has been described in the introduction that distance sensors 2 to be tested, which have a direction-dependent radiation and/or reception behavior, may be difficult to test with the test bench described in the prior art (distance sensors based on the MIMO principle were mentioned as an example). According to the invention, it has been recognized that this problem is related to the fact that the used and location-variable wave characteristics cannot be detected sufficiently accurately with the known test bench in certain situations, whereby test bench transmission signals that do not correspond to the actual conditions and are possibly inconsistent from the point of view of the distance sensor to be tested then follow or are generated.

FIGS. 2 to 5 now show test benches 1 which can also be used to simulate more complex test situations with electromagnetic waves. The solutions shown have in common that at least one test bench receiving element 7, 7a, 7b and one test bench radiating element 8, 8a, 8b are arranged together in a movable part 6m of the connecting member 6. This design of the test benches 1 in FIGS. 2 to 4 ensures that a test bench receiving element 7a, 7b and a respective associated test bench radiating element 8a, 8b can only ever be deflected together. Accordingly, it makes sense that the resulting functional pairs 7a, 8a and 7b, 8b of test bench receiving elements 7a, 7b and test bench radiating elements 8a, 8b assigned to each other and belonging to each other are arranged in close proximity to each other, since, in this way, locations of reception of the transmission signals 4 of the distance sensor 2 and the radiation locations of the test bench transmitting signals 9 as simulated reflection signals are locally as congruent as possible, as is also the case in real physical object environments. In this way, even complicated wave characteristics can be simulated by the test bench 1.

Figure 2:
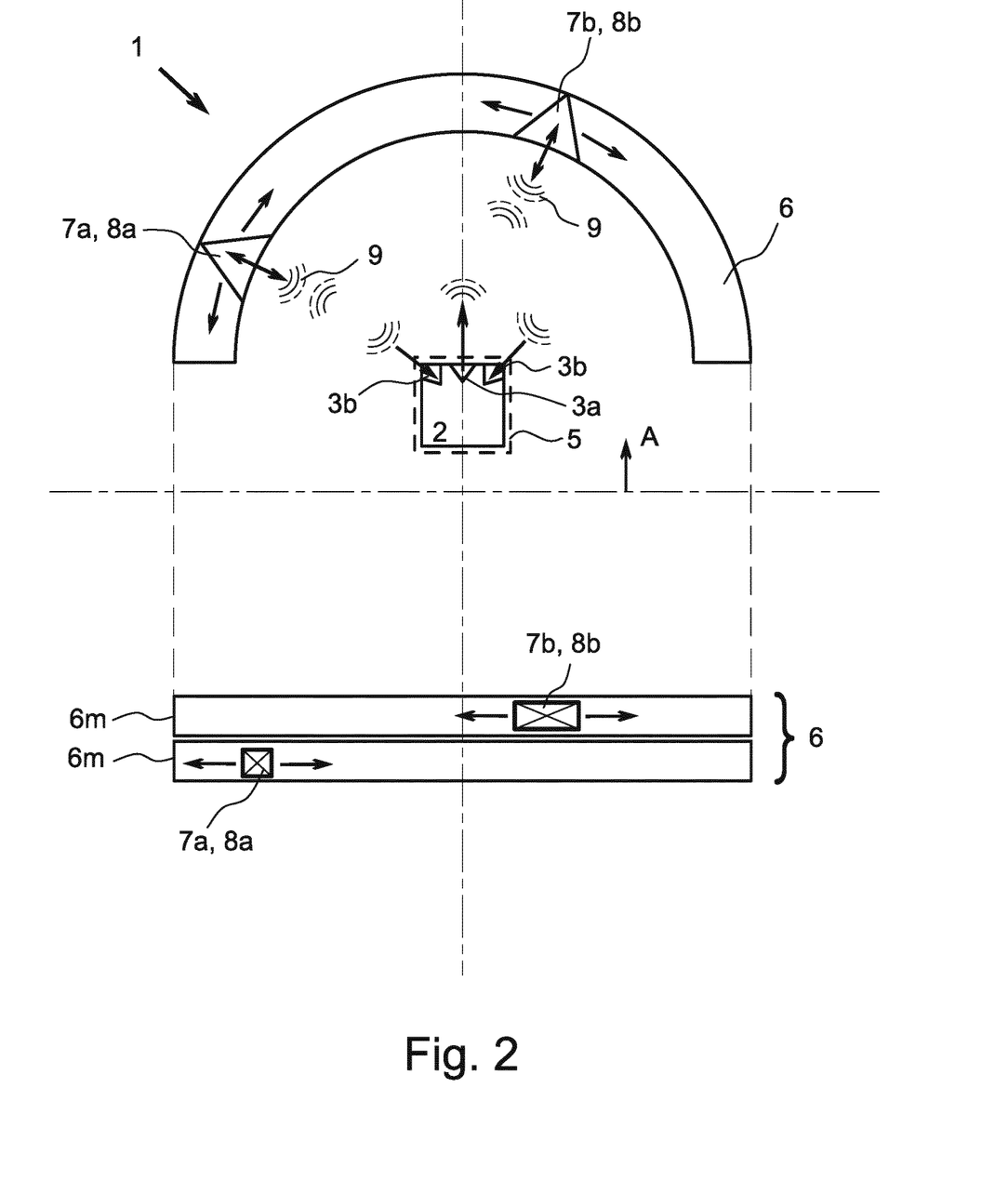
FIG. 2 illustrates a test bench according to the invention with integrally formed test bench receiving and radiating elements.
Figure 3:
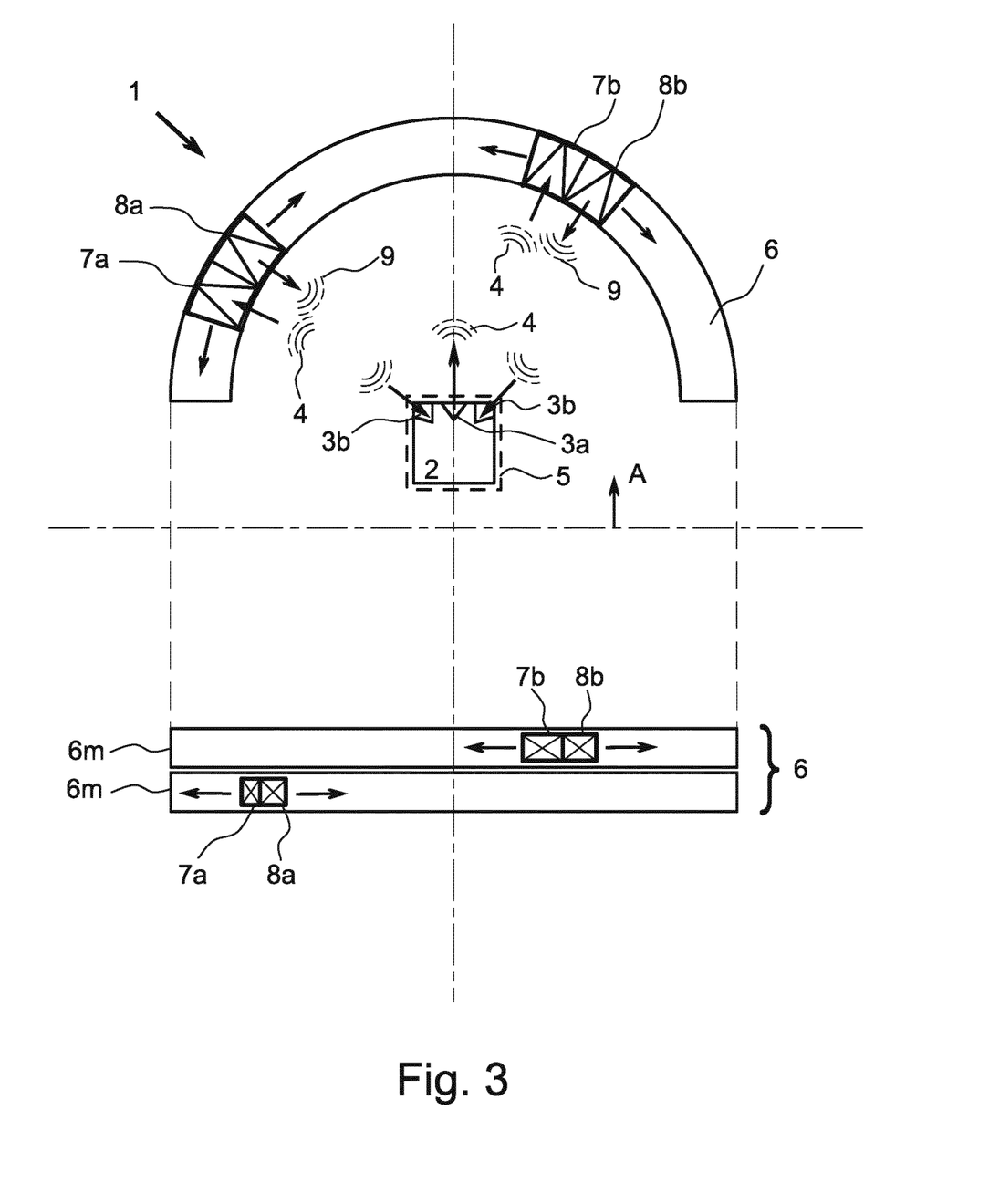
FIG. 3 illustrates a test bench according to the invention with a separate test bench receiving element and a separate test bench radiating element arranged adjacent to each other.
Figure 4:
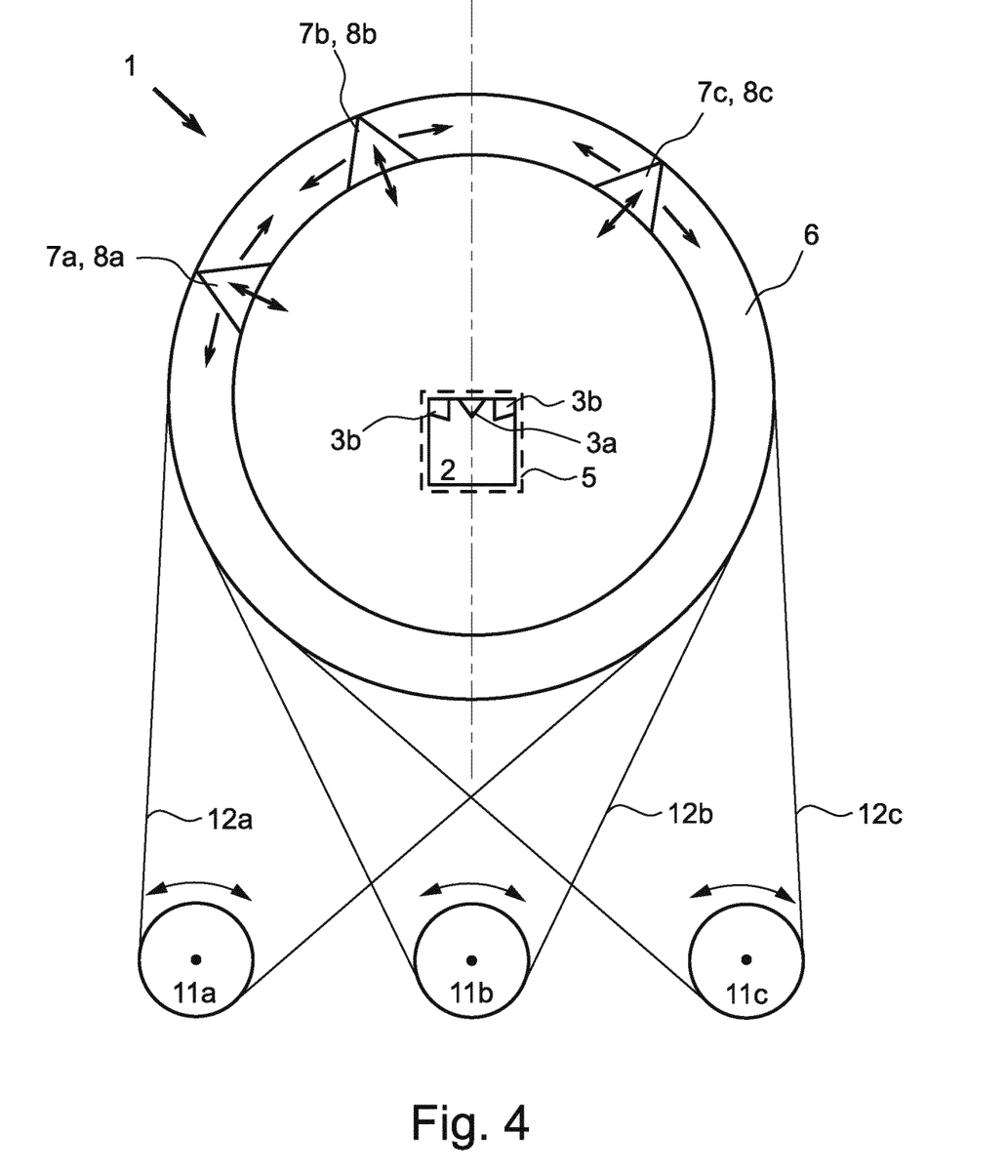
FIG. 4 illustrates a test bench according to the invention with a belt drive.

In FIGS. 2 to 4, the distance sensor 2 to be tested is shown as a distance sensor 2 with a somewhat more complicated reception characteristic, namely one sensor radiating element 3a and several sensor receiving elements 3b are indicated there respectively. Real distance sensors 2 also have multiple sensor radiating elements and may also have far more sensor receiving elements.

The embodiments in FIGS. 2 and 3 have in common that there are several different moving members 6m of the connecting member 6. In the illustrated embodiment example, there are a total of two movable parts 6m, in each of which a test bench receiving element 7a, 7b and a test bench radiating element 8a, 8b are arranged together.

The embodiment according to FIG. 2 is characterized in that the test bench receiving element 7a, 7b and the test bench radiating element 8a, 8b arranged together in a movable part 6m of the connecting member 6 are formed as an identical (integrally formed) test bench receiving and radiating member 7a, 8a and 7b, 8b. In the present case, the distance sensor 2 to be tested is a radar sensor, so that the identical and integrally formed test bench receiving and radiating elements 7a, 8a and 7b, 8b respectively have, in particular, a common antenna for radar waves. In FIG. 2, it is indicated in the upper part by the double arrows that the test bench receiving and radiating elements 7a, 8a and 7b, 8b, respectively, have both transmitting and receiving properties.

The embodiment example shown in FIG. 3 is characterized in that the test bench receiving element 7a, 7b arranged together in a movable part 6m of the connecting member 6 and the respective associated test bench radiating element 8a, 8b are arranged adjacent to each other (namely side by side in this case) as a separate test bench receiving element 7a, 7b and as a separate test bench radiating element 8a, 8b, in this case specifically as separate antennas for radio waves. In embodiments not shown here, an adjacent arrangement of the elements is also possible one above the other. In this embodiment, downstream signal processing automatically results in two different signal channels for the reception and output of electromagnetic waves, whereas in the embodiment according to FIG. 2, only one signal channel is used, so that downstream processing electronics have to work with a signal switch.

The illustrated embodiments also have in common that the connecting member 6, which is identical here to the movable parts 6m of the connecting member 6, is or are configured as arc-shaped, namely circular segment-shaped elements or as circular ring segment-shaped elements, wherein the elements open concavely towards the receptacle 5 of the distance sensor 2 to be tested. The movable parts 6m of the connecting member 6 are mounted so as to be movable horizontally—i.e., in azimuth—along their circular ring shape. The axis of rotation of the circular ring segment-shaped elements exists here only virtually, i.e., non-tangibly, since an axis of rotation as such is not implemented having a bodily form. The several movable parts 6m are designed as circular ring segment-shaped elements mounted on top of each other and movable opposite each other, which is only suggested from the lower schematic representations in the side view of the figures.

The core of the test bench design according to the invention is the arrangement of the test bench receiving elements 7 and the test bench radiating elements 8 in the connecting member 6. In this respect, therefore, the distance sensor 2 to be tested does not belong to the test bench 1 described and claimed. Nevertheless, it is described closely in connection with the test bench 1, since only in the context of a distance sensor 2 to be tested can functional relationships be meaningfully represented.

In FIG. 4, it is shown schematically that the movable, circular ring segment-shaped elements 6m are driven and deflected by means of a belt drive 10. In the illustrated embodiment, there are a total of three movable elements 6m, each having a test bench receiving and radiating element 7a, 8a and 7b, 8b and 7c, 8c, respectively. The three different movable elements 6m are each driven by a separate drive roller 11a, 11b, 11c by means of a toothed belt 12a, 12b, 12c.

FIG. 4 further shows that the connecting member 6 is covered with an absorber material 13 for the electromagnetic radiation used—in this case radar waves—in the areas where no test bench receiving element 7 and no test bench radiating element 8 is held.

Figure 5:
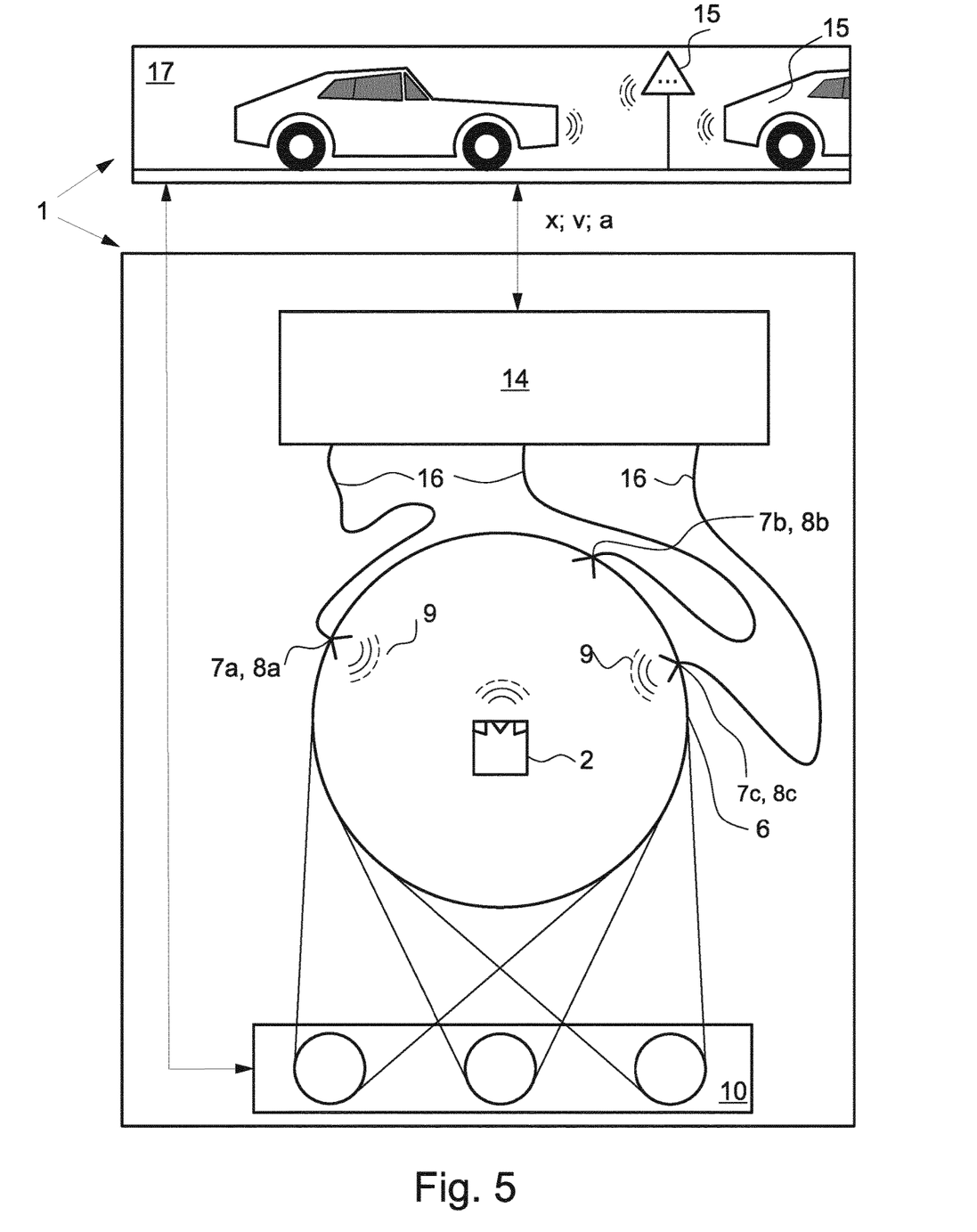
FIG. 5 illustrates a test bench according to the invention with distance simulator and environment simulator.

FIG. 5 shows an extended configuration of the previously illustrated test bench 1. Here, a reflection simulator 14 is provided, wherein the reflection simulator 14 is connected in terms of signals to the test bench receiving members 7a, 7b and the test bench radiating members 8a, 8b, which are arranged together in a movable part 6m of the connecting member 6. The reflection simulator 14 is designed to receive the transmission signal 4 radiated by the distance sensor 2 to be tested via the test bench receiving element 7 and to generate a corresponding test bench transmitting signal 9 on the basis of provided location and movement information as well as properties $x_i$; $v_i$; $a_i$, (i.e., location and/or velocity and/or acceleration and/or object size) of a simulated surrounding object 15 and to radiate it via the test bench radiating element 8a, 8b; 8c in the direction of the distance sensor 2 to be tested.

The test bench receiving element 7 and the test bench radiating element 8 are connected to the reflection simulator 14 via a multi-conductor cable 16, wherein one conductor or pair of conductors is used to supply power to the test bench receiving element 7 and the test bench radiating element 8. Another conductor is used to transmit an oscillator signal from the reflection simulator 14 to the test bench receiving element 7, namely for down-converting of the frequency of the received transmission signal 4 from the distance sensor 2 to be tested and for up-converting of the frequency of a low-frequency reflection signal simulated by the reflection simulator 14. In this regard, a conductor is used to transmit the down-converted transmitting signal received in the test bench receiving element 7 from the distance sensor 2 under test to the reflection simulator 14, or respectively to transmit the low-frequency simulated reflection signal simulated and generated by the reflection simulator 14 from the reflection simulator 14 to the test bench radiating element 8.

FIG. 5 further shows that the reflection simulator 14 is connected in terms of signals to an environment simulator 17, and the reflection simulator 14 receives from the environment simulator 17 location and motion information ($x_i$, $v_i$, $a_i$) of a simulated environment object 15 for each functional pair 7a, 8a; 7b, 8b of a test bench receiving member 7a, 7b and a test bench radiating member 8a, 8b, which are arranged together in a movable part 6m of the connecting member 6.

FIG. 5 finally shows that a drive 10 of a pair 7a, 8a; 7b, 8b consisting of a test bench receiving element 7a, 7b and a test bench radiating element 8a, 8b is connected in terms of signals to the environment simulator 17, and the environment simulator 17 obtains position and movement information of the pair 7a, 8a. from the simulated relative position of the distance sensor 2 to be tested to the respective associated simulated environment object 15; 7b, 8b of test bench receiving element 7a, 7b and test bench radiating element 8a, 8b and controls the drive 10 accordingly for actualizing the calculated position and movement information.

The invention claimed is:

1. A test bench for testing a distance sensor operating with electromagnetic waves, wherein the distance sensor to be tested includes at least one sensor radiating element for radiating a transmission signal and a sensor receiving element for receiving a reflection signal, the test bench comprising:
    a receptacle for holding the distance sensor to be tested;
    an at least partially movable connecting member in the radiation area of a distance sensor held in the receptacle;
    a test bench receiving element held in the connecting member for receiving a transmission signal radiated by the sensor radiating element; and
    a test bench radiating element held in the connecting member for radiating a test bench transmitting signal as a simulated reflection signal;
    wherein the test bench receiving element and the test bench radiating element are arranged together in a movable part of the connecting member.

2. The test bench according to claim 1, wherein the test bench receiving element and the test bench radiating element are arranged together in a plurality of different movable parts of the connecting member.

3. The test bench according to claim 1, wherein the test bench receiving element and the test bench radiating element arranged together in the movable part of the connecting member are formed as at least one of a common antenna for radar waves, a common optical element for electromagnetic waves in the visible spectrum, and a common laser receiving/transmitting element.

4. The test bench according to claim 1, wherein the test bench receiving element and the test bench radiating element arranged together in a movable part of the connecting member are arranged adjacent to each other as at least one of separate antennas for radar waves, separate optical elements for electromagnetic waves in the visible spectrum, and a separate laser receiving element and laser transmitting element.

5. The test bench according to claim 1, wherein at least one of the connecting member and the movable part of the connecting member is designed as an arc-shaped element;
   wherein the element opens concavely towards the receptacle of the distance sensor to be tested; and
   wherein the movable part of the connecting member is mounted movably horizontally along its arc-shape.

6. The test bench according to claim 5, wherein the connecting member has a plurality of movable parts which are configured as arc-shaped elements which are mounted one above the other and are movable relative to one another; and
   wherein the plurality of movable parts of the connecting member have a common axis of rotation.

7. The test bench according to claim 5, wherein the movable arc-shaped element is driven and deflected by a belt drive.

8. The test bench according to claim 1, wherein the connecting member is covered with an absorber material for the electromagnetic radiation used or is formed from such a material in the regions in which no test bench receiving element and no test bench radiating element is held.

9. The test bench according to claim 1, further comprising a reflection simulator connected in terms of signals to the test bench receiving element and the test bench radiating element, which are arranged together in a movable part of the connecting member;
   wherein the reflection simulator is designed to receive the transmission signal radiated by the distance sensor to be tested via the test bench receiving element and, on the basis of provided location and movement information of a simulated environment object, to generate a corresponding test bench transmitting signal, and to radiate it via the test bench radiating element in the direction of the distance sensor to be tested.

10. The test bench according to claim 9, wherein at least one of the test bench receiving element and the test bench radiating element is connected to the reflection simulator via a multi-conductor cable;
   wherein one conductor or one conductor pair is used to supply power to at least one of the test bench receiving element and the test bench radiating element;
   wherein one conductor is used to transmit an oscillator signal from the reflection simulator to the test bench receiving element for frequency down-converting the received transmission signal from the distance sensor to be tested and for frequency up-converting a low-frequency reflection signal simulated by the reflection simulator; and
   wherein one conductor is used to transmit the down-converted transmission signal received in the test bench receiving element from the distance sensor to be tested to the reflection simulator, or, respectively to transmit the low-frequency reflection signal simulated and generated by the reflection simulator from the reflection simulator to the test bench radiating element.

11. The test bench according to claim 9, wherein the reflection simulator is connected in terms of signals to an environment simulator and the reflection simulator receives location and movement information of a simulated environment object from the environment simulator for each functional pair of a test bench receiving element and a test bench radiating element which are arranged together in a movable part of the connecting member.

12. The test bench according to claim 11, wherein a drive of a pair comprising a test bench receiving element and a test bench radiating element is connected to the environment simulator in terms of signals, and the environment simulator uses the simulated relative position of the distance sensor to be tested with respect to the associated simulated environment object to obtain position and movement information of the pair of test bench receiving element and test bench radiating element and controls the drive accordingly to actualize the calculated position and movement information.

* * * * *